United States Patent
Schulz et al.

(10) Patent No.: US 7,952,308 B2
(45) Date of Patent: May 31, 2011

(54) METHOD AND APPARATUS FOR TORQUE RIPPLE REDUCTION

(75) Inventors: Steven E. Schulz, Torrance, CA (US);
John P. Miller, Northville, MI (US);
Khwaja M. Rahman, Troy, MI (US);
Soo-Yeol Lee, Rancho Palos Verdes, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 513 days.

(21) Appl. No.: 12/098,287

(22) Filed: Apr. 4, 2008

(65) Prior Publication Data
US 2009/0251096 A1    Oct. 8, 2009

(51) Int. Cl.
*H02K 29/06* (2006.01)
*H02P 6/10* (2006.01)

(52) U.S. Cl. .............. 318/400.23; 318/400.07; 318/432; 318/434

(58) Field of Classification Search .................. 318/432, 318/400.23, 400.07, 434
See application file for complete search history.

(56) References Cited

U.S. PATENT DOCUMENTS 7,145,310 B2 * 12/2006 Ihm et al. ............ 318/717
7,768,220 B2 *  8/2010 Schulz et al. ......... 318/432

OTHER PUBLICATIONS

Wu, A.P. et al. "Cancellation of Torque Ripple Due to Nonidealities of Permanent Magnet Synchronous Machine Drives," IEEE Power Electronics Specialist Conference, 2003, pp. 256-261, vol. 1.
Chapman, P.L. et al. "Optimal Current Control Strategies for Surface-Mounted Permanent-Magnet Synchronous Machine Drives," IEEE Transaction on Energy Conversion, Dec. 1999, pp. 1043-1050, vol. 14, No. 4.
Kang, C. et al. "An Efficient Torque Control Algorithm for BLDCM with a General Shape of Back EMF," 24th Annual IEEE Power Electronics Specialist Conference, 1993, pp. 451-457.
Lu, C.W. et al. "Novel Approach to Current Profiling for AC Permanent Magnet Motors," IEEE Transactions on Energy Conversion, Dec. 1999, pp. 1294-1299, vol. 14, No. 4.
Favre, E. et al. "Permanent-Magnet Synchronous Motors: a Comprehensive Approach to Cogging Torque Suppression," IEEE Transactions on Industry Applications, Nov./Dec. 1993, pp. 1141-1149, vol. 29, No. 6.
Choi, J. et al. "Novel Periodic Torque Ripple Compensation Scheme in Vector Controlled AC Motor Drives," Thirteenth Annual Applied Power Electronics Conference, 1998, pp. 81-85, vol. 1.
Hung, J.Y. et al. "Minimization of Torque Ripple in Permanent Magnet Motors: a Closed Form Solution," IEEE Power Electronics and Motion Control, 1992, pp. 459-463, vol. 1.
Le-Huy, H. et al. "Minimization of Torque Ripple in Brushless DC Motor Drives," IEEE Transactions on Industry Applications, Jul./Aug. 1986, pp. 748-755, vol. IA-22, No. 4.
Lee, S. et al. "A Harmonic Reference Frame Based Current Controller for Active Filter," IEEE School of Electrical Engineering, 2000, pp. 1073-1078.

* cited by examiner

*Primary Examiner* — Bentsu Ro
*Assistant Examiner* — Erick Glass
(74) *Attorney, Agent, or Firm* — Ingrassia Fisher & Lorenz, P.C.

(57) ABSTRACT

Methods and apparatus are provided for reducing torque ripple in a permanent magnet motor system comprising a permanent magnet motor coupled to an inverter. The method comprises the steps of receiving a torque command, generating a torque ripple reduction signal in response to the torque command, modifying operational control signals in response to the torque ripple reduction signal to generate reduced ripple operational control signals, and providing the reduced ripple operational control signals to the inverter for control of the permanent magnet motor.

20 Claims, 12 Drawing Sheets

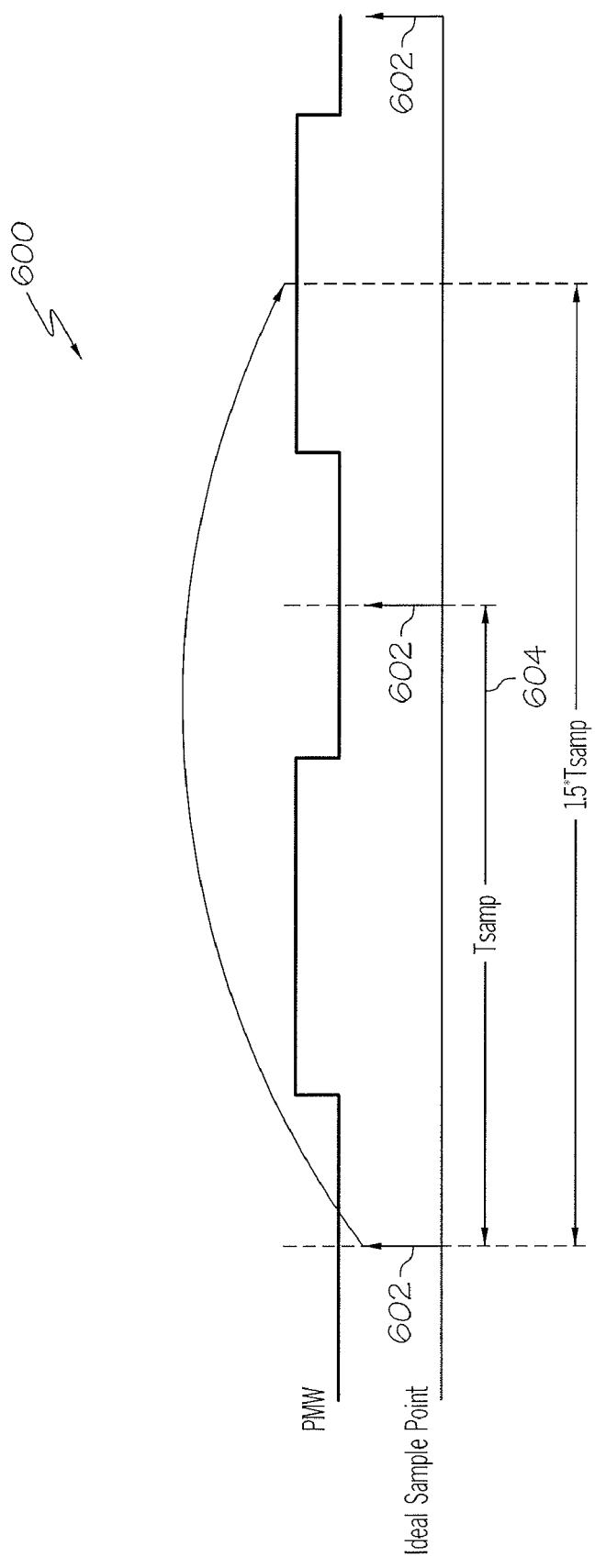

METHOD AND APPARATUS FOR TORQUE RIPPLE REDUCTION

TECHNICAL FIELD

The present invention generally relates to alternating current (AC) motor drive systems, and more particularly relates to a method and apparatus for torque ripple reduction in AC motor drive systems.

BACKGROUND OF THE INVENTION

The primary purpose of an alternating current (AC) motor drive is to provide a requested torque to the motor shaft. Ideally, the provided torque is constant with no distortion or ripple. Toward this end, the typical motor drive attempts to provide a balanced set of purely sinusoidal currents to the motor stator windings. However, due to practical design constraints of the AC motor, torque ripple will exist even with purely sinusoidal stator current excitation. Motor designers usually attempt to minimize the torque ripple generated by the AC motor. This can be accomplished by paying particular attention to design aspects such as winding configuration, stator tooth geometry, rotor barrier geometry, and rotor skewing. However, there exists a trade-off between torque ripple and torque density of the AC motor. Hence, in all practical applications the AC motor will produce some torque ripple when supplied by a sinusoidal current.

Depending upon the application, torque ripple can have certain adverse affects. For example, the torque ripple can cause speed ripple or excite driveline resonances. In the case of an electric or hybrid vehicle, this can result in vehicle oscillations which are a disturbance to the occupants. Active damping algorithms are often employed to counter these adverse affects. Additionally, stator vibrations and acoustic noise can be generated by the radial forces imposed on the stator laminations. Mitigating acoustic noise by passive means, such as the addition of structural reinforcement or sound dampening materials, can be a costly and undesirable solution. For these reasons, it is desired to develop a software based solution to minimize torque ripple, stator vibration, and acoustic noise.

Accordingly, it is desirable to provide a method and apparatus to reduce the stator radial forces in order to decrease vibration and acoustic noise. In addition, it is desirable to cancel or reduce a selected torque ripple harmonic. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A controller is provided for generating reduced torque ripple pulse width modulated operational control signals in a permanent magnet motor system. The controller includes a harmonic cancellation synchronous regulator block for receiving a torque command and generating a torque ripple reduction signal in response thereto, and a current regulated torque control module for receiving the torque command and the torque ripple reduction signal and for generating the reduced torque ripple pulse width modulated operational control signals in response thereto.

A method is provided for reducing torque ripple in a permanent magnet motor system comprising a permanent magnet motor coupled to an inverter. The method comprises the steps of receiving a torque command, generating a torque ripple reduction signal in response to the torque command, modifying operational control signals in response to the torque ripple reduction signal to generate reduced ripple operational control signals, and providing the reduced ripple operational control signals to the inverter for control of the permanent magnet motor.

DESCRIPTION OF THE DRAWINGS

The present invention will hereinafter be described in conjunction with the following drawing figures, wherein like numerals denote like elements.

FIG. 6 illustrates a timing diagram of the phase width modulated (PWM) signal delay of the electric motor drive system of FIG. 4 in accordance with the embodiment of the present invention;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
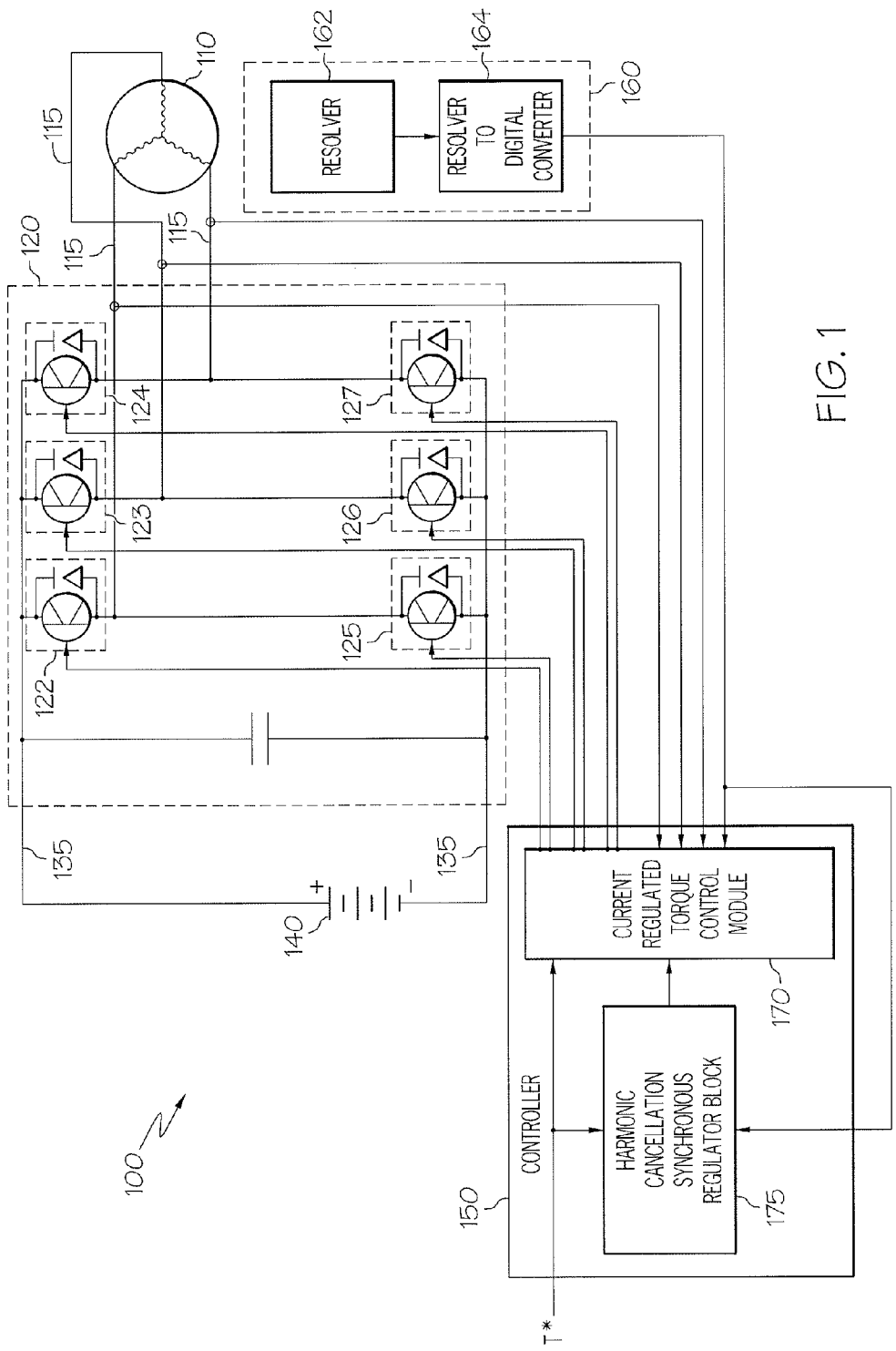
FIG. 1 illustrates an electric motor drive system in accordance with an embodiment of the present invention.

Referring to FIG. 1, an electric motor system 100 in accordance with an embodiment of the present invention includes a three-phase alternating current (AC) synchronous electric machine 110, such as an internal permanent magnet (IPM) motor, which operates in response to signals from an inverter 120. The inverter 120 providing electric control for the electric motor 110 is connected between direct current (DC) bus lines 135 of a power source 140. The inverter 120 includes switches 122, 123, 124, 125, 126, 127, each of the switches including a transistor such as an Insulated Gate Bipolar Transistor (IGBT) connected in parallel with an antiparallel diode. The switches 122, 123, 124, 125, 126, 127 operate in response to signals from a controller 150 to gates of the transistors thereof to provide voltage to each phase 115 of the motor 110, each of the switch pairs 122/125, 123/126 and 124/127 forming a phase leg of the inverter 120.

A speed detection circuit 160 measures the rotor position and speed of the motor 110 and includes a resolver 162 (or similar speed sensing device) coupled to the motor 110 to sense the position of a rotor of the motor 110 and, thereby, the speed of the motor 110. The speed detection circuit 160 also includes a resolver-to-digital converter 164 which converts the signals from the resolver 162 to digital signals (e.g., a digital motor speed signal and a digital rotor angular position signal). The resolver-to-digital converter 164 provides the digital representations of angular position and speed of the rotor of the electric motor 110 to the controller 150.

In accordance with the embodiment, the controller 150 includes a current regulated torque control module 170 and a harmonic cancellation synchronous regulator block 175. The output of the current regulated torque control module 170 is coupled to the gates of each of the transistors of the switches 122, 123, 124, 125, 126, 127 for providing a motor control signal to the inverter 120 as operational control signals for the transistors of the switches 122, 123, 124, 125, 126, 127.

A torque command (T*) is provided to an input of the controller 150 and is provided to both the current regulated torque control module 170 and the harmonic cancellation synchronous regulator block 175. The current regulated torque control module 170 receives current signals from each phase 115 of the motor 110. The currents sensed from the phases 115 are a three phase sinusoidal current signal which, in accordance with the present embodiment, includes a fundamental frequency signal and one or more harmonics thereof, the harmonic(s) having amplitude(s) thereof defined in accordance with a predetermined torque ripple characteristic of the motor 110.

The harmonic cancellation synchronous regulator block 175 generates a torque ripple reduction signal in response to the torque command and the predetermined torque ripple characteristic of the electric motor system 100. In accordance with the present embodiment, the torque ripple reduction signal includes one or more predetermined harmonics of the current signal defined in response to the predetermined torque ripple characteristic of the motor 110 for injecting into the current signal to be provided to the motor 110.

In accordance with the present embodiment, the current regulated torque control module 170 modifies the currents sensed from the phases 115 of the motor 110 in response to the torque control signal and the torque ripple reduction signal received from the harmonic cancellation synchronous regulator block 175 to generate reduced ripple operational control signals for provision to the inverter 120. Accordingly, the reduced ripple operational control signals are applied as command signals/gate drive signals to the gates of the transistors 122, 123, 124, 125, 126, 127. Thus, in accordance with the present embodiment, the currents at each of the phases 115 is received and modified by the current regulated torque control module 170 in response to the torque ripple reduction signal to provide appropriate gain for reduced ripple operational control signals which are provided to the inverter 120.

Figure 2A:
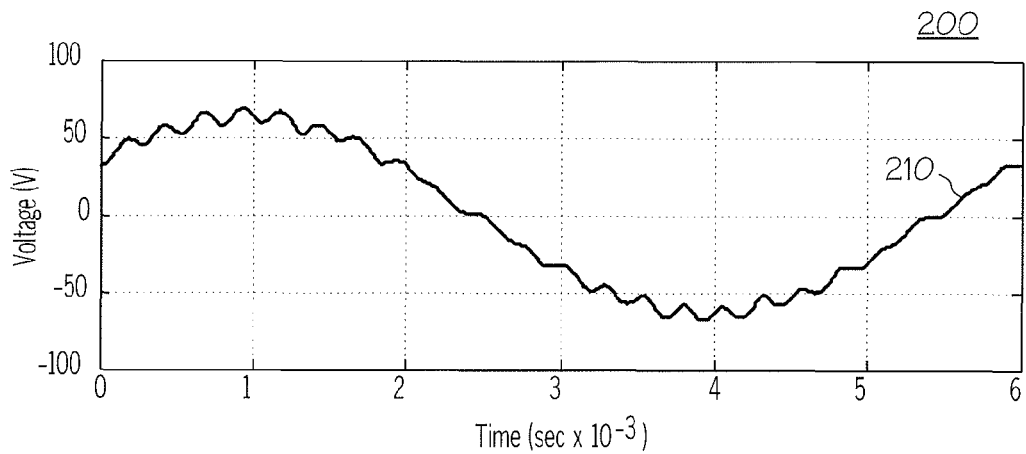
FIG. 2A illustrates a time vs. voltage graph of phase back electromagnetic force (EMF) for the electric motor system of FIG. 1 in accordance with the embodiment of the present invention.
Figure 2B:
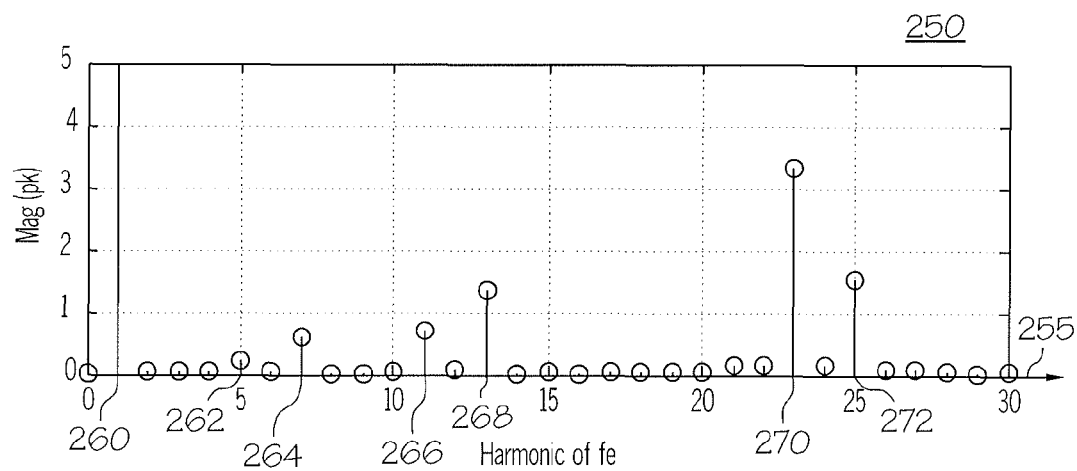
FIG. 2B illustrates a fast fourier transform of the back EMF waveform plot of FIG. 2A as a graph of harmonics vs. harmonic magnitude in accordance with the embodiment of the present invention.

Referring to FIG. 2A, a time vs. voltage graph 200 of phase back electromagnetic force (EMF) 210 for the electric motor system 100 in accordance with the present embodiment illustrates the back EMF measurement for the IPM motor 110. It is clear from graph 200 that the time domain waveform 210 is not sinusoidal, but is distorted with harmonic content. FIG. 2B depicts a graph 250 which illustrates a fast fourier transform of the time domain back EMF waveform 210 as a graph 250 of harmonics vs. harmonic magnitude. The frequency axis 255 is plotted as harmonics of the fundamental motor electrical frequency $f_e$ 260, which is the first harmonic (harmonic one) and is off the vertical scale. The graph 250 also plots the harmonics zero to thirty (harmonic zero to harmonic thirty) which include various harmonics which result in the distorted time domain waveform 210. In particular, significant harmonics of the fundamental frequency 260 appear at five, seven, eleven, thirteen, twenty-three and twenty-five times the fundamental frequency (i.e., harmonic five 262, harmonic seven 264, harmonic eleven 266, harmonic thirteen 268, harmonic twenty-three 270 and harmonic twenty-five 272).

Figure 3A:
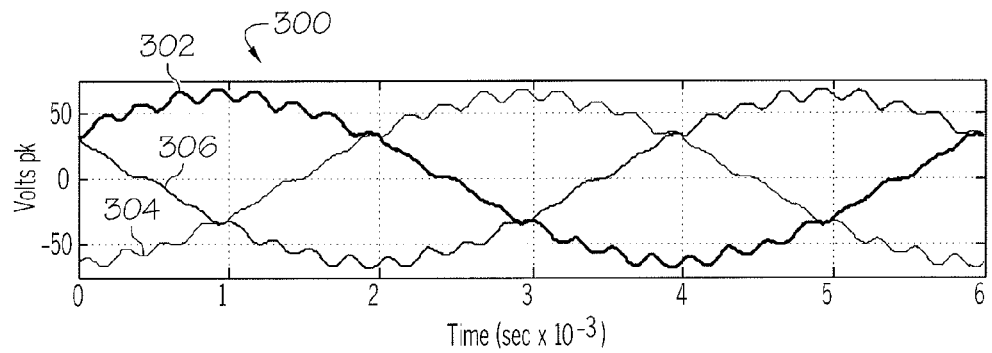
FIG. 3A illustrates a time vs. voltage graph of phase back EMF for the voltages of the three phases of the electric motor system of FIG. 1 in accordance with the embodiment of the present invention.

The electric motor 110 is a three-phase motor and the present embodiment is discussed in terms of three phases. The present invention, however, is equally applicable to most multi-phase electric motor systems. Referring to FIG. 3A, a time vs. voltage graph 300 of phase back EMF for the voltages of the three phases of the electric motor system 100 depicts waveforms 302, 304, 306 for each of the three phases 115 of the motor 110.

Figure 3B:
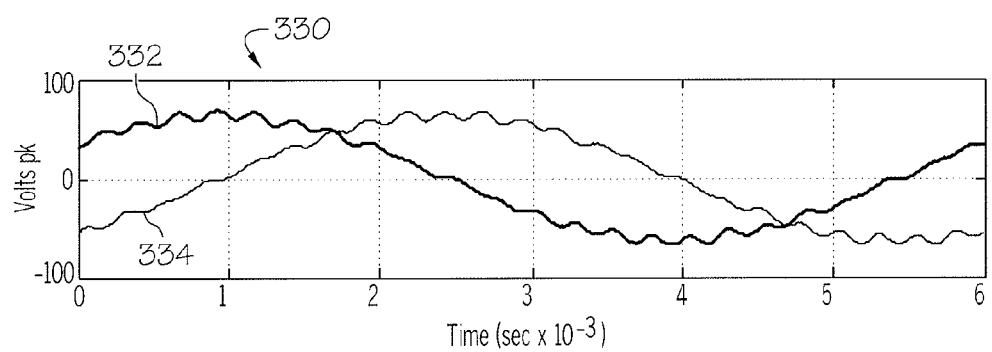
FIG. 3B a time vs. voltage graph of phase back EMF for the two stationary frame voltages of the back EMF waveform plot of FIG. 3A in accordance with the embodiment of the present invention.

In accordance with motor analysis principles, to identify which harmonics of the waveforms 302, 304, 306 can be reduced to reduce torque ripple in the motor system 100 in accordance with the present embodiment the three phase waveforms is transformed into two phase waveforms before performing a complex FFT operation on the two phase waveforms. Using a conventional three-phase to two-phase transformation well-known to those skilled in the art, an equivalent two-phase representation of the three phase back EMF waveforms 302, 304, 306 is shown in the graph 330 of FIG. 3B. The two-phase component waveforms 332, 334 are orthogonal and are referred to as alpha and beta components of the three phase back EMF waveforms 302, 304, 306.

Figure 3C:
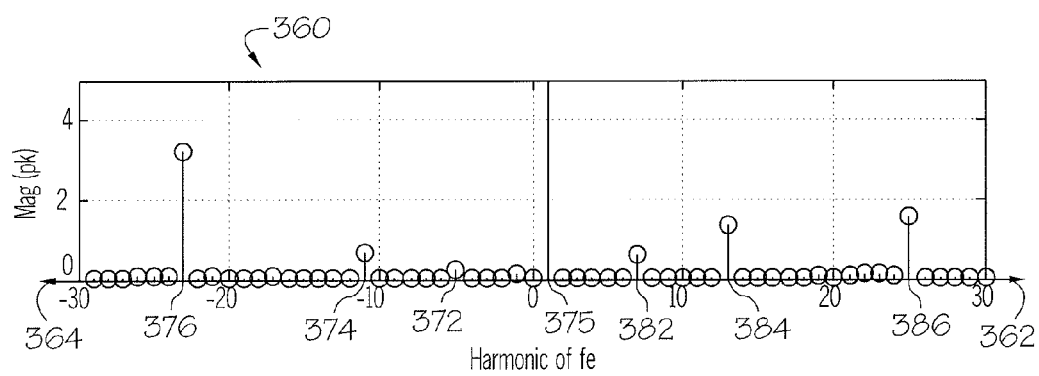
FIG. 3C illustrates a fast fourier transform of the back EMF waveform plot of FIG. 3B as a graph of harmonics vs. harmonic magnitude in accordance with the embodiment of the present invention.

A complex FFT of the waveforms 332, 334 of the two-phase alpha and beta components is depicted in the plot 360 of FIG. 3C. The complex FFT operation resolves the harmonics of the three phase back EMF waveforms 302, 304, 306 into their appropriate sequence, either positive or negative. The positive frequency axis 362 represents positive sequence components, while the negative frequency axis 364 represents negative sequence components. We can now see that the fifth harmonic 372, eleventh 374, and twenty-third 376 harmonics are negative sequence, while the seventh 382, thirteenth 384, and twenty-fifth 386 are positive sequence.

Torque ripple will be generated at the difference frequencies between the back EMF harmonics and the fundamental current signal. As the fundamental current is a first positive sequence signal 375, torque ripple is expected to be generated at the sixth, twelfth, and twenty-fourth harmonics thereof.

In accordance with the present embodiment, to cancel the nth harmonic torque ripple, current is injected at the n+1 (positive sequence) harmonic, the 1−n (negative sequence) harmonic, or both. While the present embodiment describes a method and apparatus for canceling a single harmonic, the same principles can be extended to cancel multiple harmonics, if desired.

Figure 4:
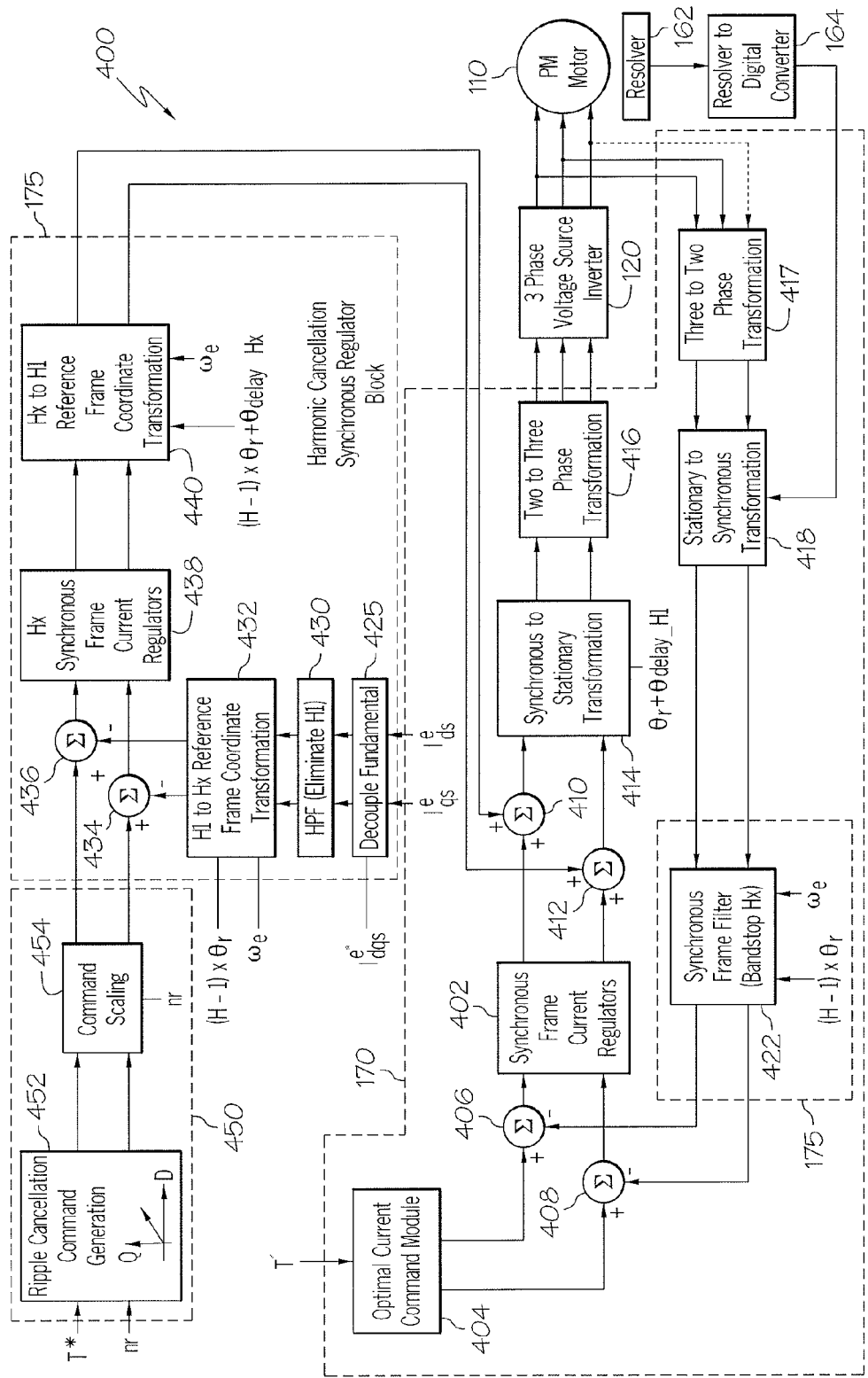
FIG. 4 illustrates a more detailed block diagram of the electric motor system of FIG. 1 in accordance with the embodiment of the present invention.

Referring to FIG. 4, a more detailed block diagram 400 of the electric motor drive system 100 reduces torque ripple on a predetermined harmonic. The predetermined harmonic is the one of the plurality of harmonics selected for reducing torque ripple in accordance with the present embodiment, such as the sixth, twelfth or twenty-fourth harmonic of the fundamental harmonic.

The current regulated torque control module 170 centers around synchronous frame current regulators 402, which regulate the fundamental current (i.e., the current at the fundamental harmonic, harmonic one). The torque command signal T* is inputted to an optimal current command determination block 404 of the current regulated torque control module 170 which generates therefrom two current commands in the synchronous reference frame for the fundamental harmonic, $I_{ds}^{e*}$ and $I_{qs}^{e*}$. The current commands for the synchronous frame of the fundamental harmonic, $I_{ds}^{e*}$ and $I_{qs}^{e*}$, are each provided to one of summing junctions 406 and 408. Fundamental feedback currents $I_{ds\_fb}^{e}$ and $I_{qs\_fb}^{e}$ are also fed to the summing junctions 406, 408. The output of the summing junctions 406, 408 are the fundamental harmonic synchronous frame error signals, which are provided to inputs of the fundamental harmonic synchronous frame current regulators 402.

The outputs of the fundamental harmonic current regulators 402 are intermediate voltage commands $V_{ds\_1}^{e*}$ and $V_{qs\_1}^{e*}$, which are passed to summing junctions 410 and 412. Summers 410 and 412 combine the intermediate voltage commands from the fundamental harmonic synchronous frame current regulators 402 with synchronous reference frame voltage commands for the predetermined harmonic, $V_{ds\_H}^{e*}$ and $V_{qs\_H}^{e*}$ from the harmonic cancellation synchronous regulator block 175, where the synchronous reference frame voltage commands, $V_{ds\_H}^{e*}$ and $V_{qs\_H}^{e*}$, are a harmonic cancellation signal and the summers 410, 412 inject the harmonic cancellation signal to generate the final fundamental harmonic synchronous frame voltage commands $V_{ds}^{e*}$ and $V_{qs}^{e*}$. These voltage commands $V_{ds}^{e*}$ and $V_{qs}^{e*}$ are processed by a synchronous to stationary transformation module 414, which uses rotor position $\theta_r$ to transform the voltage commands from the fundamental harmonic synchronous reference frame to the stationary reference frame in accordance with a conventional coordinate transformation.

The outputs of the transformation module 414 are the stationary frame two phase alpha/beta voltage commands $V_{\alpha*}$ and $V_{\beta*}$. The alpha/beta voltage commands are then passed to the two phase to three phase transformation block 416, which converts the alpha/beta voltage commands to the equivalent 3-phase signals $V_{a*}$, $V_{b*}$, and $V_{c*}$. The 3-phase stationary frame voltage commands $V_{a*}, V_{b*}, V_{c*}$ are the reduced ripple operational control signals passed to the 3-phase voltage source inverter 120, which processes the voltage commands and applies the commanded voltages to stator windings of the three phase IPM motor 110.

The resolver 162 provides absolute position sensing as is required for synchronous type motors. The output signals of the resolver 162 are processed by the resolver to digital converter 164, which converts the resolver analog signals to a digital word representing the rotor electrical angular position $\theta_r$. Two (or three) stator phase currents are sensed and passed to a three to two phase transformation module 417 of the current regulated torque control module 170. The three to two phase transformation module 417 converts the three phase currents $I_a$, $I_b$ and $I_c$ to equivalent two phase alpha/beta currents $I_\alpha$ and $I_\beta$, and a stationary to synchronous transformation module 418 transforms the alpha/beta currents to fundamental harmonic synchronous frame quantities $I_{ds}^e$ and $I_{qs}^e$.

In accordance with the present embodiment, the reduced ripple operational control signals are designed to inject a current of the predetermined harmonic into the stator in order to cancel a specific torque ripple corresponding to the predetermined harmonic. A synchronous frame filter 422 acts as a bandstop on the desired torque ripple cancellation injection harmonic (i.e., the predetermined harmonic) and is part of the harmonic cancellation synchronous regulator block 175 (i.e., not part of the conventional current regulated torque control module 170).

The bandstop filter 422 has a center frequency on the predetermined harmonic and filters out the predetermined harmonic from the synchronous frame currents $I_{ds}^e$ and $I_{qs}^e$ to generate the fundamental frame feedback currents $I_{ds\_fb}^e$ and $I_{qs\_fb}^e$ and provide them to the summing junctions 406, 408. In this manner, the bandstop filter 422 prevents the fundamental harmonic synchronous frame regulator 402 from responding to the current injected at the predetermined harmonic to cancel the desired torque ripple component of the operational control signals. In addition, the bandstop filter 422 aids decoupling of the two controller reference frames. The rotor position $\theta_r$ and the electrical angular velocity $\omega_e$ in rads/sec are also inputted to the bandstop filter 422. In addition to other features of the bandstop filter 422, it is also designed to minimize phase delay as described hereinbelow.

Referring to the harmonic cancellation synchronous regulator block 175, a fundamental frequency decoupling block 425 measures the fundamental harmonic synchronous frame currents, $I_{ds}^e$ and $I_{qs}^e$, and subtracts out the fundamental current commands $I_{ds}^{e*}$ and $I_{qs}^{e*}$, thereby dramatically improving the dynamic torque response of the controller 150, as described hereinbelow.

A high pass filter 430 and a transformation block 432 together form a fundamental harmonic bandstop filter. The high pass filter (HPF) 430 blocks out the DC component of the fundamental frequency synchronous frame currents $I_{ds}^e$ and $I_{qs}^e$, thereby eliminating the fundamental frequency component. Higher frequency harmonics, above the filter corner frequency, are able to pass unattenuated through the high pass filter 430. The transformation block 432 transforms the signals from the fundamental harmonic synchronous reference frame into the predetermined harmonic synchronous reference frame currents $I_{ds\_H}^{He}$ and $I_{qs\_H}^{He}$ using the rotor position $\theta_r$ and the electrical angular velocity $\omega_e$, inputted thereto, to eliminate phase delay caused by the high pass filter 430.

Scaled predetermined harmonic current commands $I_{ds\_H}^{He}$ and $I_{qs\_H}^{He}$, are compared to the feedback currents $I_{ds\_H}^{He}$ and $I_{qs\_H}^{He}$ at summing junctions 434 and 436. The output of the summing junctions 434, 436 are synchronous reference frame current errors at the predetermined harmonic, these signals being passed to predetermined harmonic synchronous frame current regulators 438. The output of the synchronous frame regulators 438 are the voltage commands $V_{ds\_H}^{He*}$ and $V_{qs\_H}^{He*}$. These voltage commands are then transformed from the predetermined harmonic reference frame to the fundamental harmonic reference frame by a reference frame coordinate transformation block 440. The outputs of this block are the predetermined harmonic regulator voltage commands in the fundamental harmonic reference frame $V_{ds\_H}^{e*}$ and $V_{qs\_H}^{e*}$ which are provided to the summers 410, 412 to be combined with the output of the fundamental reference frame current regulators 402. The reference frame coordinate transformation block 440 includes PWM delay compensation in the transformation angle, as described hereinbelow.

A speed control block 450 operates to enable and disable torque ripple reduction in accordance with the present invention and includes a ripple cancellation command generator block 452 which receives the torque command T* and the motor speed signal $n_r$ and computes the D and Q axis current commands $I_{ds\_H}^{He*}$ and $I_{qs\_H}^{He*}$ for the predetermined harmonic synchronous reference frame regulators 438. The current commands $I_{ds\_H}^{He*}$ and $I_{qs\_H}^{He*}$ represent the desired current injection vector used to cancel the selected torque ripple harmonic. The commands can be stored in a variety of ways: in one or two dimensional tables or as curve fit functions, depending upon the application. The speed control block 450 also includes a command scaling block 454 coupled to the ripple cancellation command generator block 452 to scale the incoming current commands as a function of speed (i.e., define a signal amplitude of the harmonic cancellation signal in accordance with the speed of the motor 110) to smooth the transition of the current commands as the motor speed is transitioned into and out of the algorithm active region, thereby fading in or fading out the torque ripple reduction signal in response to the motor speed signal. The outputs of the command scaling block 454 are the scaled predetermined harmonic current commands $I_{ds\_H}^{He}$ and $I_{qs\_H}^{He}$ which are provided to the summers 434, 436 for combination with the feedback currents $I_{ds\_H}^{He}$ and $I_{qs\_H}^{He}$.

In accordance with the present embodiment, the components of the harmonic cancellation synchronous regulator block 175, including modules 422, 425, 430, 432, 434, 436, 438 and 440, are operated at the speed of the fast execution loop of the software of the controller 150 (e.g. ten kilohertz (10 kHz)), while the components of the speed control block 450 (i.e., the ripple cancellation command generator block 452 and the command scaling block 454) are operated at a slower rate (typically the same rate at which the fundamental harmonic synchronous frame current commands are updated (e.g., one milliseconds (1 msec)).

The predetermined harmonic frame current regulators 438 may not be able to control the harmonic current up to the maximum speed of the motor 110 due to the finite limits on the switching frequency of the inverter 120 and the controller 150 sample rate. Typically, a pulse ratio (defined as the switching frequency divided by the frequency of the current to be controlled) of approximately ten or greater must be maintained for controllability. The frequency of the harmonic selected for torque ripple reduction in accordance with the present embodiment (i.e., the frequency at the predetermined harmonic) could be a large multiple of the fundamental frequency, such as twelve or twenty-four times the fundamental frequency. Thus, at high speeds of the motor 110, the frequency at the predetermined harmonic will be quite high, and it is possible that a sufficient pulse ratio cannot be maintained. Accordingly, the speed control block 450 operates to disable operation of the predetermined harmonic frame current regulators 438 at high speeds.

Also, as the speed of the motor 110 decreases toward zero, the motor harmonics converge. At zero speed there is no distinction between the plurality of harmonics and, therefore, the harmonic cancellation synchronous regulator block 175 in accordance with the present embodiment will not function correctly. Thus, the speed control block 450 operates to disable the harmonic cancellation synchronous regulator block 175 at very low speeds.

Figure 5:
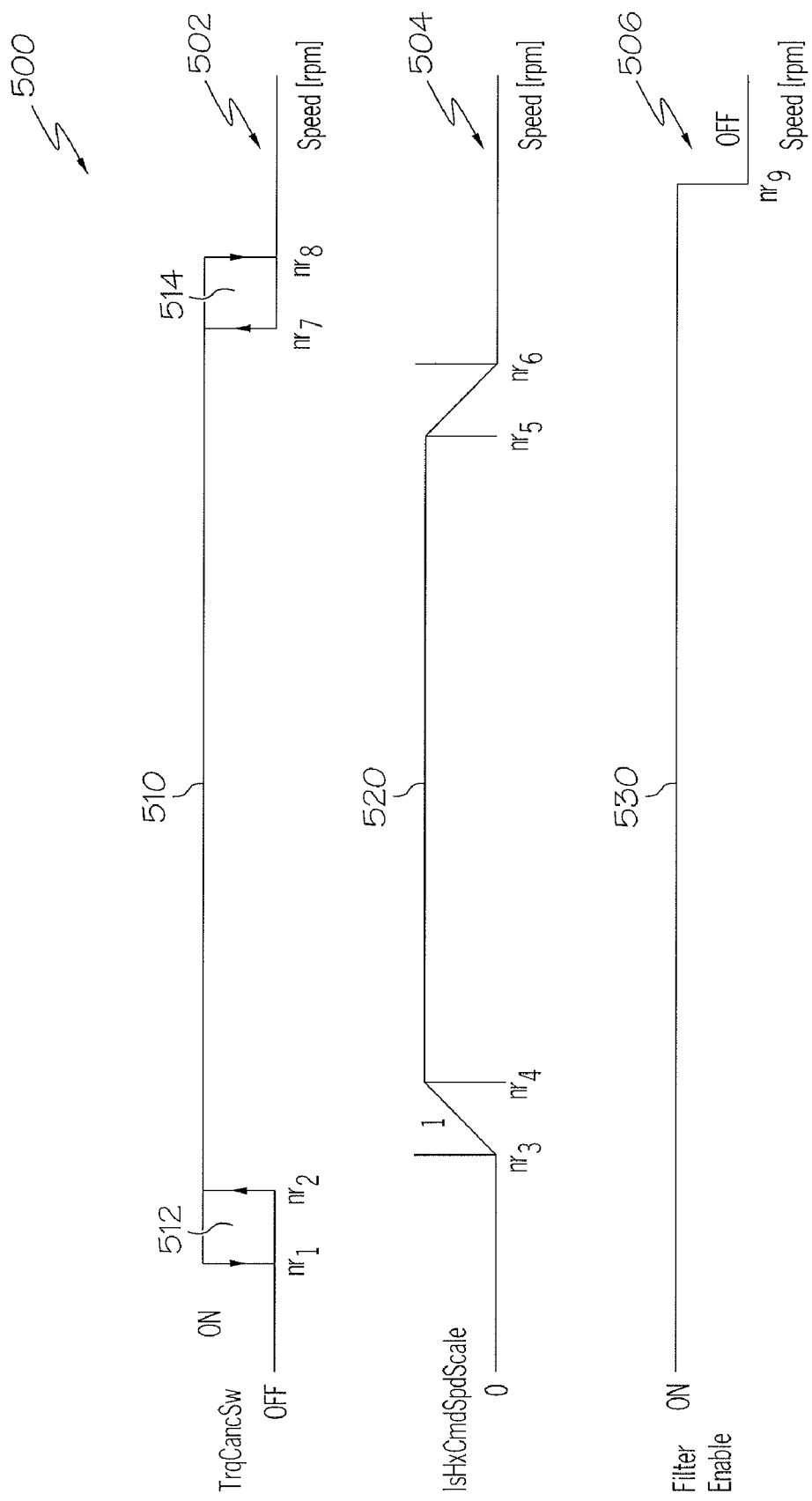
FIG. 5 illustrates signaling diagrams of the enable/disable functioning of the torque ripple functionality of the electric motor system of FIG. 4 in accordance with the embodiment of the present invention.

Referring to FIG. 5, three signaling diagrams 502, 504, 506 depict the enable/disable functioning of the torque ripple functionality of the electric motor system 100 in accordance with the present embodiment. The first signaling diagram 502 shows an enable flag TrqCancSw 510 as a function of the speed of the motor 110 which is used by the speed control block 450 to enable or disable the inputs to the predetermined frame synchronous current regulators 438. At very low and very high motor speeds, the flag 502 is set to OFF (or disable). A hysteresis 512 is used to prevent the regulator from oscillating ON and OFF if the speed is slowly passing through the ON/OFF transition range. Typical speed breakpoints might be 100 rpm on the lower end and 1000 rpm on the upper end, with 50 rpm of hysteresis. When the flag TrqCancSw 510 is high (or ON), the predetermined harmonic regulators 438 are enabled, and when the flag TrqCancSw 510 is low (or OFF), the predetermined harmonic regulators 438 are disabled.

To prevent the cancellation commands from abruptly changing as the motor speed moves across the enable/disable transition boundary, the current commands are phased in (and out) with speed, by scaling them with a multiplier IsHxCmdSpdScale 520 as shown in the second signaling diagram 504. This scaling is performed by the command scaling block 454 of the speed control block 450 as described by Equation 1:

$$I_{ds\_H}^{He**} = IsHxCmdSpdScale \cdot I_{ds\_H}^{He*}$$

$$I_{qs\_H}^{He**} = IsHxCmdSpdScale \cdot I_{qs\_H}^{He*} \quad (1)$$

Since filters 422 and 430 have certain settling times, the filters 422 and 430 are enabled and disabled to prevent disturbances when the predetermined harmonic current regulators 438 are enabled or disabled as a function of the speed of the motor 110. Thus, in accordance with the present embodiment, the filters 422 and 430 remain functional at certain speeds even when the TrqCancSw flag 510 disables the predetermined harmonic current regulators 438. However, to prevent wasted execution time of the controller 150 at very high speeds of the motor 110, the filters 422 and 430 are disabled when the speed of the motor 110 exceeds a predefined threshold. Signaling diagram 506 shows the filter enable/disable flag 530. Notice the filters 422, 430 will only be disabled for $n_r > n_{r9}$. Thus, for very high speeds of the motor 110, all functions in the harmonic cancellation synchronous regulator block 175 and the speed control block 450 can be disabled.

As the motor 110 decelerates below $n_{r9}$, the two filters 422 and 430 will be enabled. And as speed of the motor 110 drops below $n_{r7}$, the predetermined harmonic current regulators 438 will be enabled with zero current commands. Between speeds $n_{r6}$ to $n_{r5}$, the commands will be linearly phased in. The reverse process occurs as the speed of the motor 110 approaches zero, with the exception that the two filters 422, 430 remain operational.

FIG. 6 illustrates a timing diagram 600 of the motor system 100 showing the relation between current sampling, voltage command computations, and PWM implementation of the voltage commands. The vertical black arrows 602 indicate the ideal current sampling points. The processor computations follow the sample points 602, including the computation of the next duty cycle. All fast computations for the harmonic cancellation synchronous regulator block 175 must be completed during the period Tsamp 604. Since the duty cycle calculation is implemented the following cycle and the average output voltage is in the center of the PWM period, the PWM delay is modeled as shown in Equation (2). Conventional controls already compensate for this delay in the transformation block 414 by adding a compensating angle to the transformation angle, as described by Equation (3). However, the predetermined harmonic is rotating at a different and higher electrical angular velocity. In accordance with the present embodiment, the predetermined harmonic regulator voltage command transformation is compensated in transformation block 440 with the appropriate angle correction as defined in Equation (4) to avoid poor dynamic response and potential instability. In other words, the harmonic cancellation signal is injected into the operational control signals in response to a pulse width modulated (PWM) delay compensation signal derived in response to a predetermined PWM signal delay in accordance with Equation (4).

$$t_{delay} = 1.5 \cdot T_{samp} \tag{2}$$

$$\theta_{delay\_H1} = 1.5 \cdot T_{samp} \cdot \omega_e \tag{3}$$

$$\theta_{delay\_Hx} = 1.5 \cdot T_{samp} \cdot (H_x - 1) \cdot \omega_e \tag{4}$$

Figure 7A:
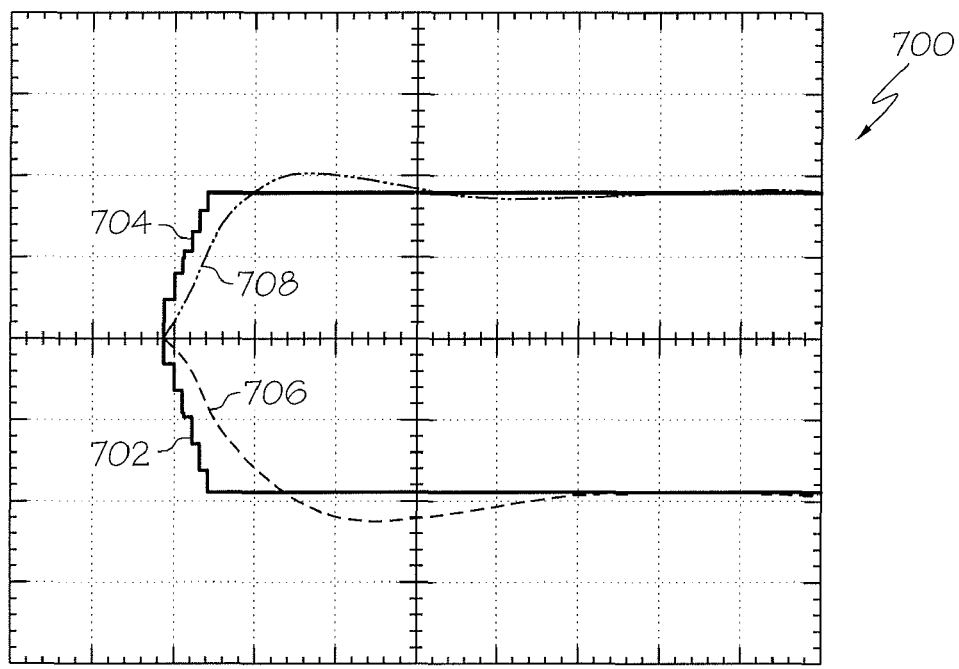
FIG. 7A illustrates a graph of the torque transient response of the electric motor drive system of FIG. 4 without fundamental current decoupling in accordance with the embodiment of the present invention.

As noted hereinabove, the fundamental decoupling block 425 performs the fundamental current decoupling. During torque transients, the predetermined harmonic reference frame currents will no longer be solely DC signals, but will have AC content due to the transient. The AC content of the signal will pass through the filter 430 and unintentionally pass through to the predetermined harmonic frame current regulators 438, resulting in very poor torque dynamics as shown in graph 700 of FIG. 7A. In graph 700 (FIG. 7A), the current commands for the synchronous frame of the fundamental harmonic $I_{ds}^{e*}$ and $I_{qs}^{e*}$ output from the optimal current command determination block 404 are graphed as traces 702 and 704, respectively. The fundamental feedback currents $I_{ds\_fb}^{e}$ and $I_{qs\_fb}^{e}$ from the output of the bandstop filter 422 are graphed as traces 706 and 708, respectively.

Figure 7B:
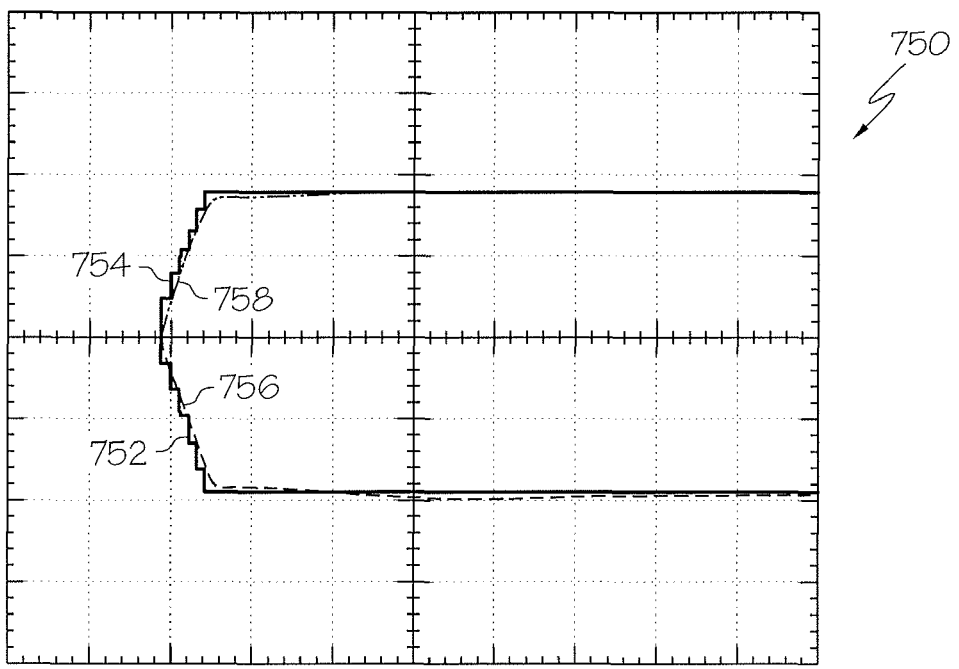
FIG. 7B illustrates a graph of the torque transient response of the electric motor drive system of FIG. 4 with fundamental current decoupling in accordance with the embodiment of the present invention.

Referring to graph 750 (FIG. 7B), the current commands for the synchronous frame of the fundamental harmonic $I_{ds}^{e*}$ and $I_{qs}^{e*}$ and the fundamental feedback currents $I_{ds\_fb}^{e}$ and $I_{qs\_fb}^{e}$ are graphed as traces 752, 754, 756 and 758, respectively. In accordance with the present embodiment, subtraction of the fundamental harmonic current commands from the measured currents (i.e. decoupling the fundamental current therefrom) provides a tremendously improved dynamic response as shown in graph 750.

Figure 8:
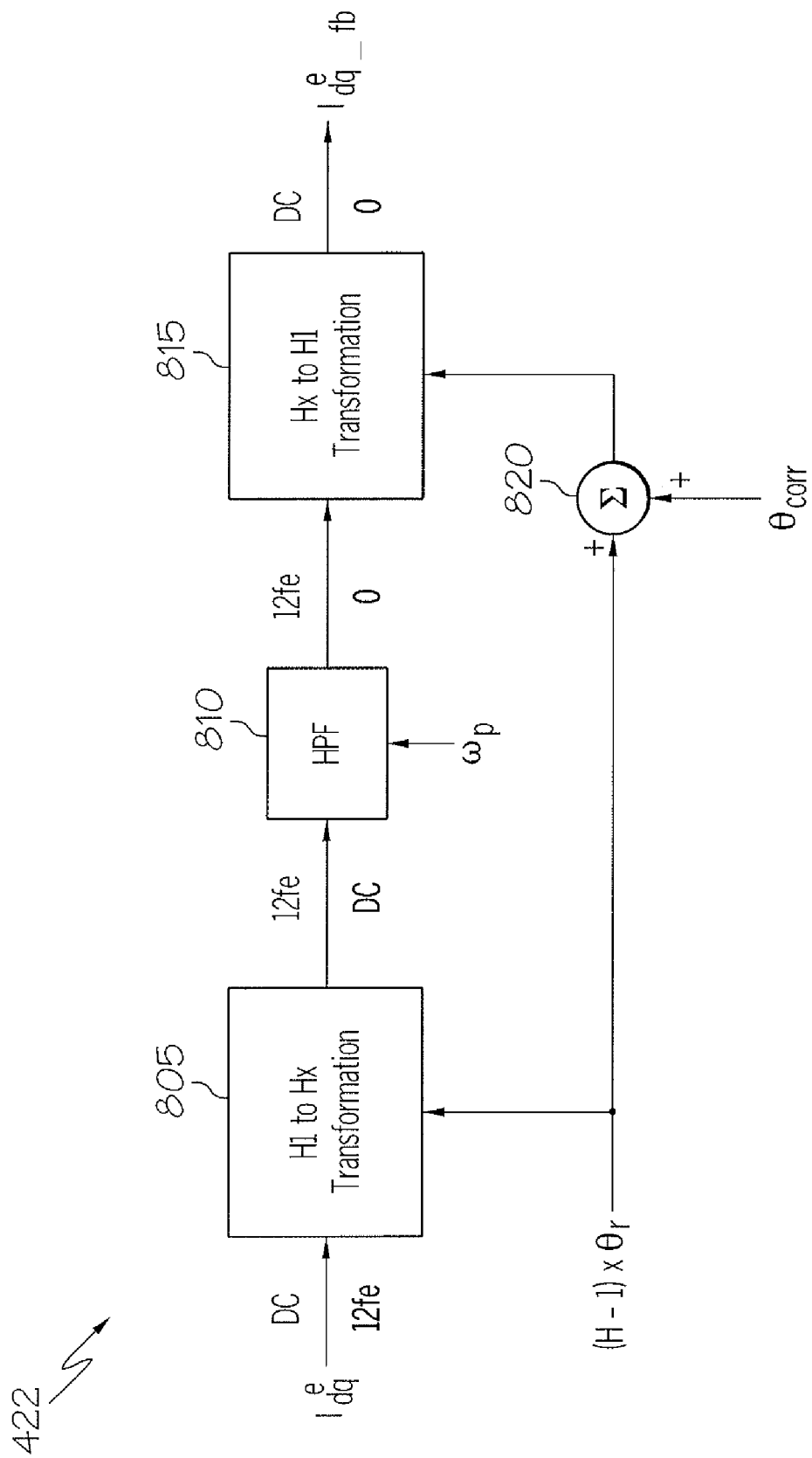
FIG. 8 illustrates a block diagram of the synchronous frame filter of the electric motor drive system of FIG. 4 in accordance with the embodiment of the present invention.

FIG. 8 illustrates a block diagram of the synchronous frame filter 422. The filter consists of a fundamental harmonic to predetermined harmonic (H1 to Hx) transformation block 805, a high pass filter (HPF) 810, and a predetermined harmonic to fundamental harmonic (Hx to H1) transformation block 815. A transformation angle $(H-1) \cdot \theta_r$ signal is provided to the H1 to Hx transformation block 805 for the transformation of the signal thereat. A correction angle $\theta_{corr}$ signal corresponding to a phase lag delay of the HPF 810 is added to the transformation angle signal at a summer 820 for provision of a phase delay compensated transformation angle signal to the Hx to H1 transformation block 815, thereby compensating for the phase delay introduced by the HPF 810, the harmonic cancellation signal being injected into the operational control signals in response to the phase lag delay. The correction angle $\theta_{corr}$ signal has a predetermined phase error angle correction value corresponding to the phase delay introduced by the HPF 810.

The text above the signal line of FIG. 6 indicates the flow of the fundamental (H1) harmonic signal through the filter 422. The H1 signal enters the filter 422 as a DC quantity because the signal inputted to the filter 422 is in the H1 synchronous reference frame. After the first transformation at block 805, the signal becomes $(H_x - 1) \cdot f_e$. For example, if we are injecting the thirteenth harmonic (i.e., the predetermined harmonic (Hx) is thirteen), then the signal is transformed to $12f_e$. The transformed signal passes through the HPF 810 because, in accordance with the present embodiment, the predetermined harmonic is chosen and the HPF 810 is designed to place the filter pole of the HPF 810 well below the predetermined harmonic frequency. As the signal passes through the filter 810, a phase shift is introduced into the signal. The second transformation block 815 then phase shift compensatedly transforms the signal back to the fundamental (H1) synchronous reference frame. The predetermined harmonic current shown below the signal line of FIG. 8, enters the filter at the frequency $(H_x - 1) \cdot f_e$. After the first transformation at the block 805, this signal is at DC. The HPF 810 completely eliminates this DC component of the signal, thereby attenuating the predetermined harmonic (Hx) signal to zero at the output of the filter 810 (i.e. infinite attenuation at the filter notch frequency).

Figure 9A:
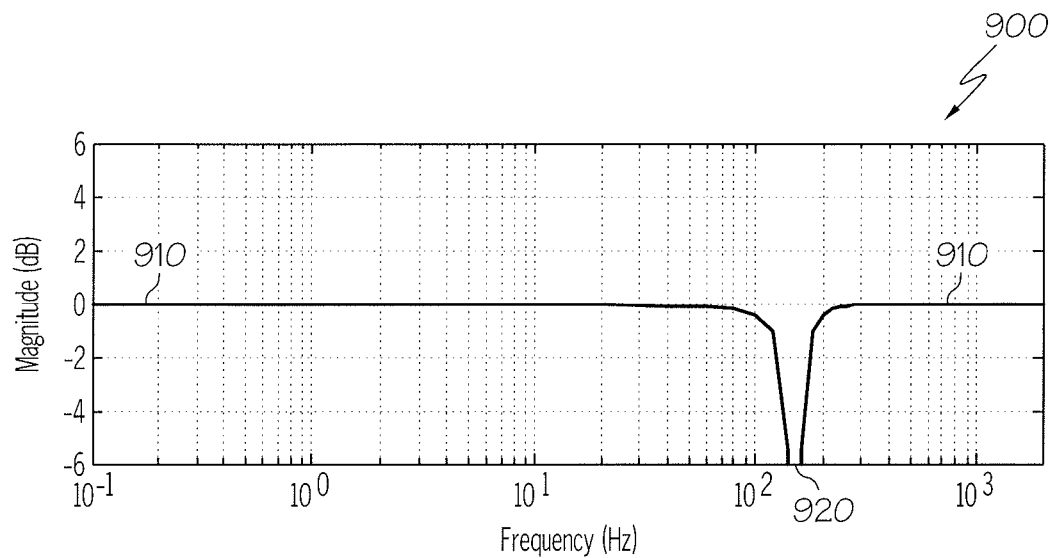
FIG. 9A illustrates a graph of frequency vs. magnitude of the filter response of the synchronous frame filter of FIG. 8 in accordance with the embodiment of the present invention.
Figure 9B:
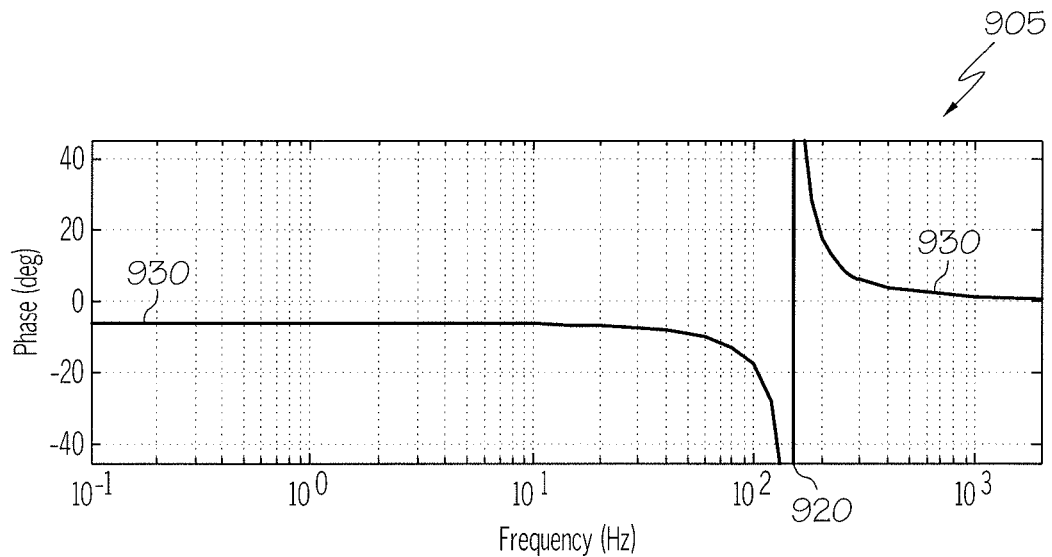
FIG. 9B illustrates a graph of frequency vs. phase of the filter response of the synchronous frame filter of FIG. 8 in accordance with the embodiment of the present invention.

Referring to FIG. 9, FIG. 9A illustrates a graph 900 of frequency vs. magnitude of the filter response of the synchronous frame filter 422 in accordance with the embodiment of the present invention, and FIG. 9B illustrates a graph 905 of frequency vs. phase of the filter response of the synchronous frame filter 422 in accordance with the embodiment of the present invention. Referring to FIG. 9A, a curve 910 of the magnitude of the filter frequency response for the filter 422 in accordance with the present embodiment is depicted. The filter has unity gain at DC and high frequencies. At the notch frequency 920, the filter has infinite attenuation, while for DC input signals the filter has finite phase shift.

As discussed hereinabove, the filter 422 introduces a phase lag. The phase lag of the filter 422 can be calculated as shown in Equation (5):

$$\phi_{lag} = -\tan^{-1}\left(\frac{\omega_p}{2\pi \cdot (f_c - f_{in})}\right) \tag{5}$$

where $f_c$ is the filter center frequency, $f_{in}$ is the input frequency, and $\omega_p$ is the filter pole in rads/sec. The phase lag is seen in the curve 930 of the phase of the filter frequency response in FIG. 9B. As can be seen in the graphs 900 and 905, Equation (5) provides an accurate model up to the notch frequency 920. Therefore, due to the harmonic relation between the fundamental electrical frequency and the notch frequency, the correction angle can be calculated as shown in Equation (6):

$$\theta_{corr} = \tan^{-1}\left(\frac{\omega_p}{2\pi \cdot (H_x - 1) \cdot f_e}\right) \quad (6)$$

Thus, in accordance with the present embodiment, Equation (6) is used to compute the correction factor which is added at summer 820 to the second transformation block 815 of the filter 422.

Figure 10A:
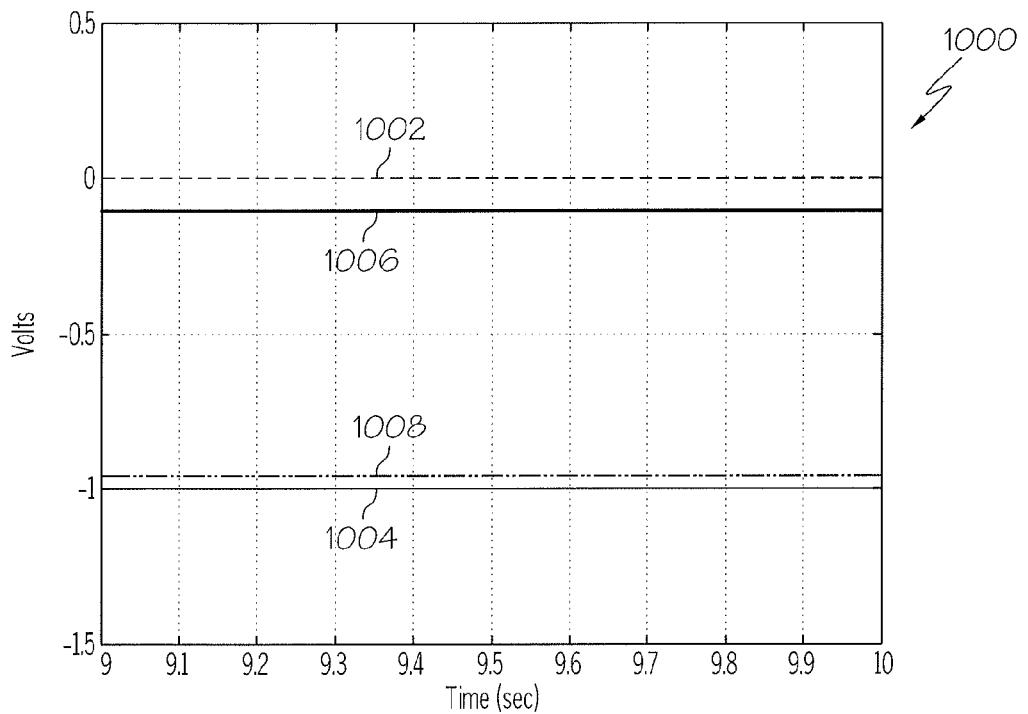
FIG. 10A illustrates a graph of time vs. voltage of the direct current (DC) response of the synchronous frame filter of FIG. 8 before phase correction in accordance with the embodiment of the present invention.

Referring to FIG. 10A, a graph 1000 of the frequency vs. magnitude of the filter response of the synchronous frame filter 422 without compensation for the phase lag of Equation (5) shows input and output signals of the filter 422 when a DC signal is inputted thereto (i.e., with a D axis input 1002 of zero, and a Q axis input 1004 of minus one). Without the phase lag compensation, the filter 422 introduces distortion which modifies the D output 1006 and the Q output 1008 from their input values 1002, 1004. This distortion is more pronounced in the D axis (i.e., the separation between the D input 1002 and the D output 1006 is greater than the separation between the Q input 1004 and the Q output 1008) because the phase shift affects the D component 1002 of the input vector angle more than the Q component 1004 thereof as the input vector is aligned with the Q axis, but orthogonal to the D axis.

Figure 10B:
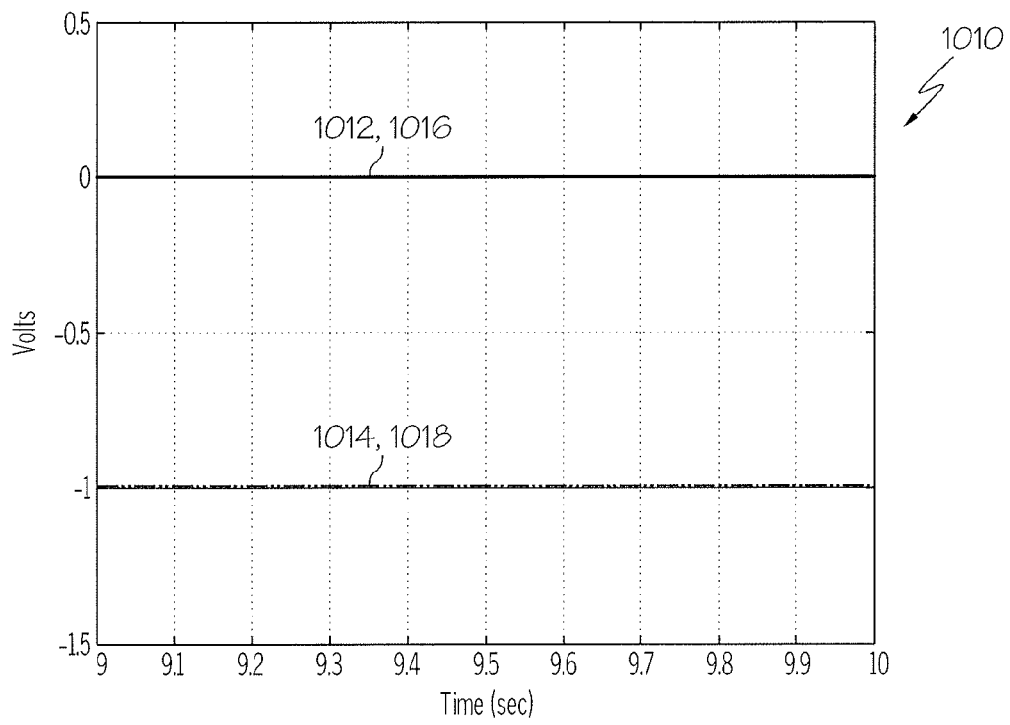
FIG. 10B illustrates a graph of time vs. voltage of the direct current (DC) response of the synchronous frame filter of FIG. 8 after phase correction in accordance with the embodiment of the present invention.

FIG. 10B shows the output of the filter 422 after applying the correction factor calculated in accordance with Equation (6), whereby the filter phase lag effect has been eliminated. Without implementation of Equation (6) in the filter 422 will result in a phase shift of the fundamental feedback current resulting in torque errors equivalent to an angle error in the fundamental signal processing.

A similar situation exists with the filter composed of blocks 430 and 432. The initial frame transformation is unnecessary because the input signals are already in the same reference frame as the component to be eliminated (i.e., the fundamental component H1). Thus, the signal for the predetermined harmonic incurs unwanted phase shift which can cause stability problems and add phase shift to the harmonic cancellation currents as a function of the speed of the motor 110 resulting in poor torque ripple cancellation. To eliminate these unwanted effects, in accordance with the present embodiment, Equation (6) is applied during the transformation at the transformation block 432 to provide a phase lag delay compensation signal to the transformation block 432 derived in response to a predetermined filter phase lag delay associated with the transformation block 432.

Figure 11A:
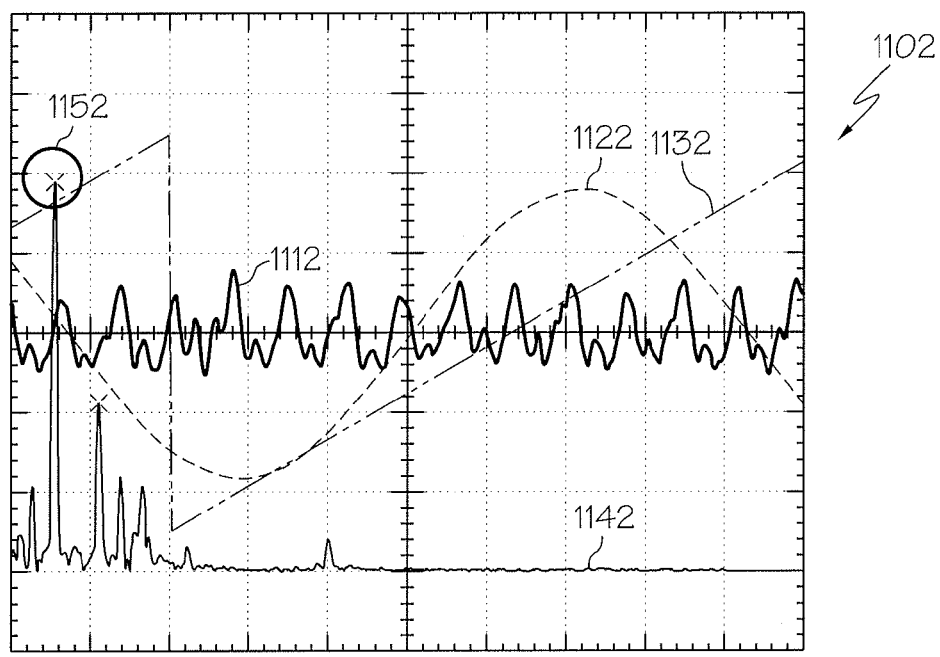
FIG. 11A illustrates a measured torque ripple of an electric motor system similar to the electric motor system of FIG. 1 without torque ripple cancellation in accordance with the embodiment of the present invention.
Figure 11B:
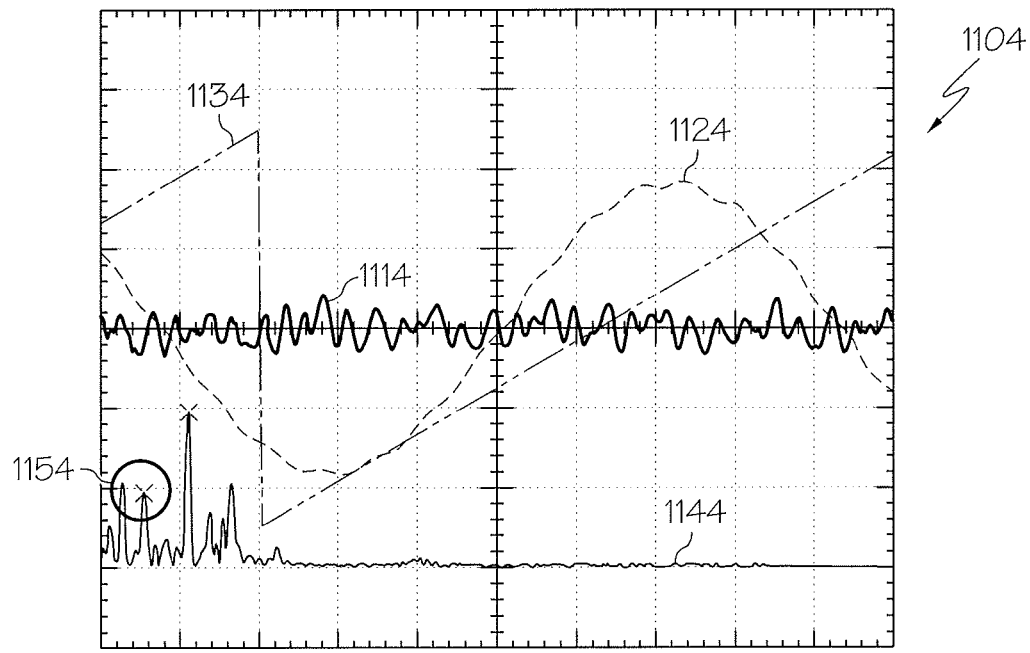
FIG. 11B illustrates a measured torque ripple of the electric motor system of FIG. 4 with torque ripple cancellation in accordance with the embodiment of the present invention.

Referring to FIG. 11, comprising FIGS. 11A and 11B, the measured performance of the electric motor system 110 with respect to torque ripple cancellation in accordance with the present invention is illustrated, where graph 1102 of FIG. 11A illustrates measured torque ripple 1112 of the electric motor system 110 without torque ripple cancellation in accordance with the present embodiment and graph 1104 of FIG. 11B illustrates measured torque ripple 1114 of the electric motor system 110 with torque ripple cancellation in accordance with the embodiment of the present invention.

Referring to graph 1102 (FIG. 11A), the controller 150 applies no torque ripple cancellation and the phase current 1122 is a very clean sine wave, yet the measured torque waveform 1112 exhibits significant ripple content (the position of the rotor of the motor 110 shown on trace 1132). The Math1 waveform 1142 is the computed FFT of the measured torque signal 1112 wherein the twelfth harmonic 1152 has a large magnitude.

Therefore, the torque ripple twelfth harmonic of the fundamental frequency is reduced in accordance with the present invention by injecting a harmonic cancellation current into the stator of the motor 110, the results of torque ripple reduction depicted in the graph 1104 (FIG. 11B), wherein the thirteenth harmonic current is used to derive the harmonic cancellation current. The measured torque waveform 1114 shows reduced ripple and the harmonic cancellation current can be seen as a ripple in the phase current waveform 1114. The rotor position is shown on trace 1134 and the computed FFT of the measured torque signal 1114 is shown as Math1 waveform 1144 wherein the twelfth harmonic 1154 has a much smaller magnitude, indicating that the targeted torque ripple component is almost completely eliminated from the torque spectrum.

Figure 12:
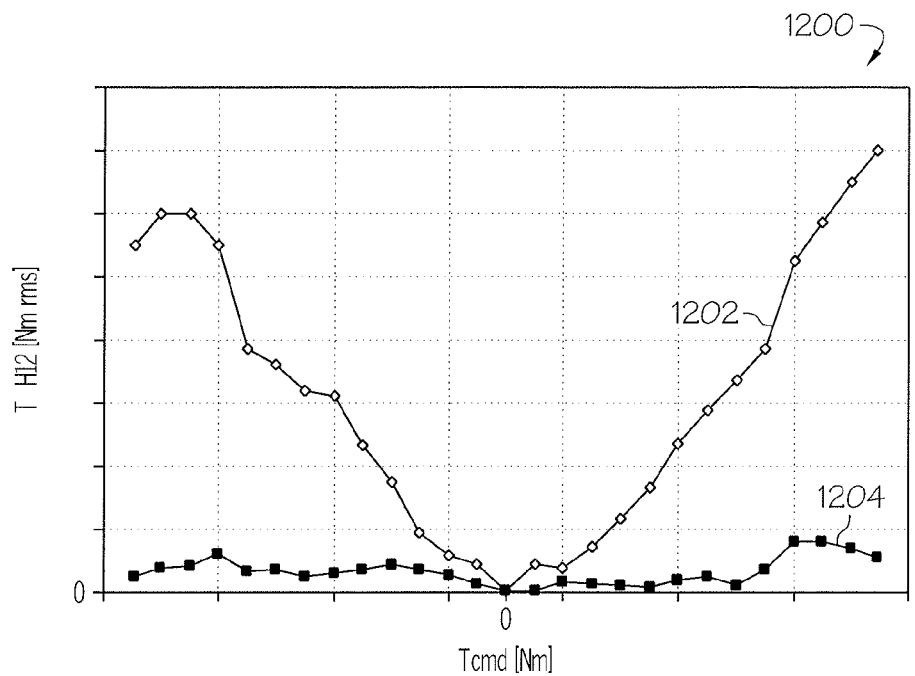
FIG. 12 illustrates a twelfth harmonic torque ripple content with torque ripple cancellation and without torque ripple cancellation in accordance with the embodiment of the present invention.

Referring to FIG. 12, a graph 1200 depicts a twelfth harmonic torque ripple content without torque ripple cancellation 1202 and a twelfth harmonic torque ripple content with torque ripple cancellation 1204 in accordance with the present embodiment evidencing performance in accordance with the present embodiment over the full torque command range. As the dominant harmonic is the twelfth harmonic, it is selected as the predetermined one of the plurality of harmonics for cancellation. It is evident in the graph 1200 that torque cancellation in accordance with the present embodiment works very well at eliminating the selected torque ripple harmonic (i.e., the twelfth harmonic) for both positive and negative torques.

Figure 13:
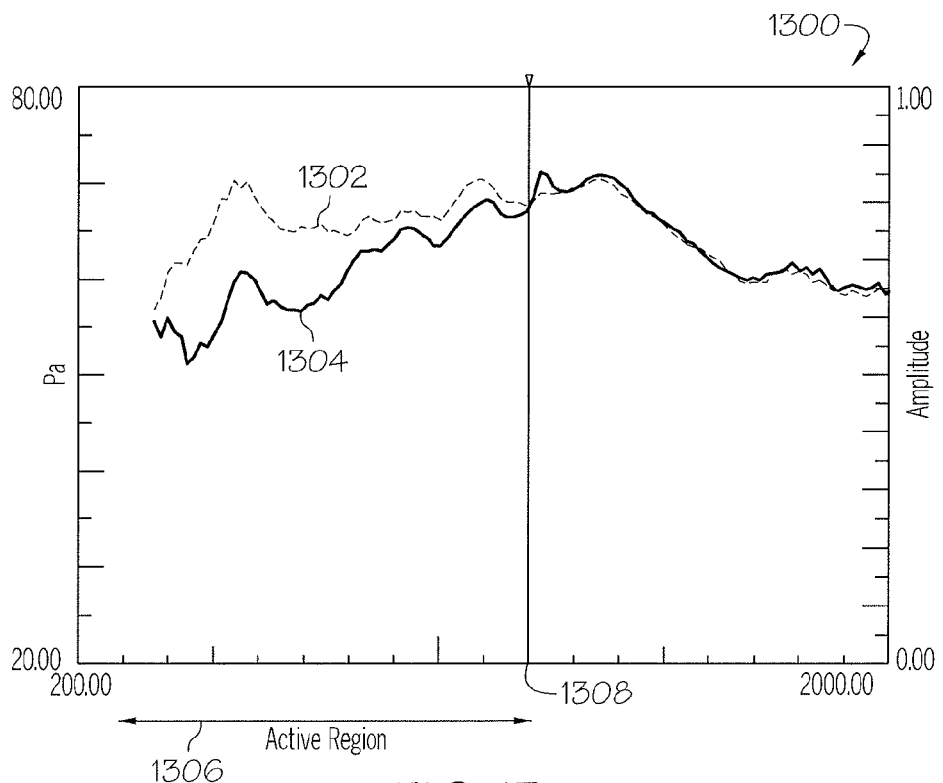
FIG. 13 illustrates measured acoustic noise of the electric motor system of FIG. 4 in accordance with the embodiment of the present invention.

Referring to FIG. 13, a graph 1300 depicts measured acoustic noise of the electric motor system of FIG. 4 in accordance with the present embodiment of the present invention. Measurements were made while the motor 110 was run at a constant torque and the speed was varied from 200 to 2000 rpm. Curve 1302 shows the measured acoustic noise without implementation of torque ripple cancellation in accordance with the present embodiment and curve 1304 shows measured acoustic noise with implementation of torque ripple cancellation at the twelfth harmonic of the fundamental current frequency in accordance with the present embodiment. The torque ripple cancellation algorithm was active in the 150 to 1200 rpm range 1306, with an upper speed cutoff 1308 where the speed control block 450 disables torque ripple reduction. When active, the algorithm can provide approximately 3 to 10 dB of reduction in acoustic noise emissions and similar results have been demonstrated for stator radial vibrations. Even though the torque ripple cancellation is disabled at higher frequencies, operation is not affected as the curve 1302 without torque ripple cancellation and the curve 1304 with torque ripple cancellation merge at the higher frequencies.

Thus it can be seen that the present invention provides a technique to inject harmonic currents into the stator of an AC machine in order to cancel specific harmonics of the torque ripple. While the present embodiment illustrates canceling a single harmonic, the same principle can be extended to cancel multiple harmonics. Additional features of the present invention such as PWM delay compensation, fundamental current decoupling, and filter delay compensation provide excellent response which is expected in a high performance AC motor drive.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for reducing torque ripple in a permanent magnet motor system comprising a permanent magnet motor coupled to an inverter, the method comprising the steps of:
   receiving a torque command;
   generating a torque ripple reduction signal in response to the torque command;
   fading the torque ripple reduction signal based upon a speed of the permanent magnet motor system;
   modifying operational control signals in response to the torque ripple reduction signal to generate reduced ripple operational control signals; and
   providing the reduced ripple operational control signals to the inverter for control of the permanent magnet motor.

2. The method in accordance with claim 1 wherein the step of generating the torque ripple reduction signal comprises the step of generating a harmonic cancellation signal in response to the torque command and a predetermined torque ripple characteristic of the permanent magnet motor system.

3. The method in accordance with claim 2 wherein the operational control signals comprise a sinusoidal signal having a plurality of harmonics, and wherein the predetermined torque ripple characteristic of the permanent magnet motor system comprises a predetermined one of the harmonics, and wherein the step of generating the harmonic cancellation signal comprises the steps of:
   generating the harmonic cancellation signal for reducing the predetermined one of the plurality of harmonics of the operational control signals in response to the torque command and the predetermined one of the plurality of harmonics; and
   injecting the harmonic cancellation signal into the operational control signals to generate the reduced ripple operational control signals, the reduced ripple operational control signals provided to the inverter for injecting a harmonic cancellation signal into stator currents of the permanent magnet motor.

4. The method in accordance with claim 3 wherein the step of generating the harmonic cancellation signal comprises the step of generating the harmonic cancellation signal having a signal amplitude defined in accordance with a speed of the permanent magnet motor.

5. The method in accordance with claim 3 wherein the step of injecting the harmonic cancellation signal into the operational control signals comprises the step of injecting the harmonic cancellation signal into the operational control signals in response to a pulse width modulated (PWM) delay compensation signal derived in response to a predetermined PWM signal delay.

6. The method in accordance with claim 3 wherein the step of injecting the harmonic cancellation signal into the operational control signals comprises the step of injecting the harmonic cancellation signal into the operational control signals in response to a phase lag delay compensation signal derived in response to a predetermined filter phase lag delay.

7. The method in accordance with claim 1 wherein the step of generating the torque ripple reduction signal comprises the step of generating the torque ripple reduction signal in response to the torque command and a speed of the permanent magnet motor.

8. The method in accordance with claim 7 wherein the step of generating the torque ripple reduction signal comprises the step of disabling the torque ripple reduction signal in response to the speed of the permanent magnet motor.

9. The method in accordance with claim 1 wherein the step of generating the torque ripple reduction signal comprises the step of generating the torque ripple reduction signal in response to the torque command and a rotor position signal, the rotor position signal generated in response to a detected position of a rotor of the permanent magnet motor system and a predetermined phase error angle correction value.

10. A controller for generating reduced torque ripple pulse width modulated operational control signals in a permanent magnet motor system, the controller comprising:
    a harmonic cancellation synchronous regulator block for receiving a torque command and generating a torque ripple reduction signal in response thereto; and
    a current regulated torque control module for receiving the torque command and the torque ripple reduction signal, for fading the torque ripple reduction signal based upon a speed of the permanent magnet motor system and for generating the reduced torque ripple pulse width modulated operational control signals in response thereto.

11. The controller in accordance with claim 10 wherein the harmonic cancellation synchronous regulator block generates the torque ripple reduction signal in response to the torque command and a predetermined torque ripple characteristic of the permanent magnet motor system.

12. The controller in accordance with claim 11 wherein the torque command comprises a sinusoidal current signal having a fundamental frequency signal and a plurality of harmonics thereof, and wherein the predetermined torque ripple characteristic of the permanent magnet motor system comprises a predetermined one of the plurality of harmonics, and wherein the harmonic cancellation synchronous regulator block generates a harmonic cancellation signal in a synchronous reference frame for the torque ripple reduction signal.

13. The controller in accordance with claim 12 wherein the harmonic cancellation synchronous regulator block comprises a fundamental frequency decoupling block for decoupling a fundamental frequency signal of the torque command from the plurality of harmonics thereof for generating the harmonic cancellation signal.

14. The controller in accordance with claim 10 wherein the harmonic cancellation synchronous regulator block generates the torque ripple reduction signal in response to the torque command and a speed of the permanent magnet motor, the controller further comprising a speed control block for disabling the torque ripple reduction signal in response to the speed of the permanent magnet motor.

15. The controller in accordance with claim 10 wherein the harmonic cancellation synchronous regulator block varies both a frequency and an amplitude of the torque ripple reduction signal in response to the speed of the permanent magnet motor.

16. An electric motor system comprising:
    a permanent magnet electric motor;
    an inverter coupled to the permanent magnet electric motor and providing electric control therefor; and
    a controller connected to the inverter for providing operational control signals thereto for operation of the permanent magnet electric motor, the controller including a harmonic cancellation synchronous regulator block for generating a torque ripple reduction signal in response to a torque command received thereby, the controller further comprising a current regulated torque control module for modifying the operational control signals for provision to the inverter in response to the torque command and the torque ripple reduction signal, wherein the controller is further configured to fade in or fade out the torque ripple reduction signal in response to a speed of the permanent magnet motor.

17. The electric motor system in accordance with claim 16 further comprising a speed detection circuit coupled to the permanent magnet electric motor for detecting a speed of the permanent magnet electric motor and for generating a motor speed signal in response thereto, wherein the harmonic cancellation synchronous regulator block of the controller is coupled to the speed detection circuit and generates the torque ripple reduction signal in response to the torque command and the motor speed signal.

18. The electric motor system in accordance with claim 17 wherein the controller further includes a speed control block coupled to the speed detection circuit and operating to disable generation of the torque ripple reduction signal in response to the motor speed signal.

19. The electric motor system in accordance with claim 18 wherein the speed control block further operates to fade in or fade out the torque ripple reduction signal in response to the motor speed signal.

20. The electric motor system in accordance with claim 16 wherein the torque command comprises a sinusoidal current signal having a fundamental frequency signal and a plurality of harmonics thereof, and wherein the harmonic cancellation synchronous regulator block generates a harmonic cancellation signal in a synchronous reference frame for the torque ripple reduction signal, the harmonic cancellation signal producing a harmonic cancellation current for modifying the operational control signals to inject the harmonic cancellation current into the permanent magnet electric motor to reduce torque ripple thereof.

* * * * *